United States Patent [19]

Zhou

[11] Patent Number: 5,476,076
[45] Date of Patent: Dec. 19, 1995

[54] INTERNAL COMBUSTION PISTON ENGINE UTILIZING INTERFERENCE MOVABLE FIT TECHNOLOGY

[76] Inventor: Zhishan Zhou, 8 BeBo HuaYuan, HaiDain YianJiang 5LU, China

[21] Appl. No.: 354,723

[22] Filed: Dec. 6, 1994

[51] Int. Cl.[6] ........................................................ F16J 1/04
[52] U.S. Cl. ............................................ 123/193.4; 92/208
[58] Field of Search .............................. 123/193.6, 193.4; 92/208

[56] References Cited

U.S. PATENT DOCUMENTS

| | | | |
|---|---|---|---|
| 4,068,645 | 1/1978 | Jenkinson | 123/193.4 |
| 4,158,328 | 6/1979 | Beardmore | 92/212 |
| 4,466,399 | 8/1984 | Hmz et al. | 92/169 |
| 4,648,309 | 3/1987 | Schellmann | 123/193.6 |
| 4,756,241 | 7/1988 | Sakurahara et al. | 123/193.6 |
| 4,760,771 | 8/1988 | Felici et al. | 123/193.6 |
| 4,852,542 | 8/1989 | Kano et al. | 123/193.6 |
| 4,864,986 | 9/1989 | Bethel et al. | 123/193.6 |
| 4,878,466 | 11/1989 | Storchevoi | 123/193.4 |
| 4,987,865 | 1/1991 | Schenkel | 92/223 |
| 5,063,894 | 11/1991 | Mielke et al. | 123/193.6 |
| 5,107,807 | 4/1992 | Arai et al. | 123/193.6 |
| 5,174,193 | 12/1992 | Parker et al. | 92/212 |
| 5,195,478 | 3/1993 | Kawabata et al. | 123/193.4 |
| 5,245,913 | 9/1993 | Kato | 123/193.6 |
| 5,251,540 | 10/1993 | Rhodes et al. | 123/193.6 |

FOREIGN PATENT DOCUMENTS

| | | | |
|---|---|---|---|
| 2238596 | 6/1991 | United Kingdom | 123/193.4 |

*Primary Examiner*—David A. Okonsky
*Attorney, Agent, or Firm*—Dowell & Dowell

[57] ABSTRACT

The present invention discloses an internal combustion piston engine having a cylinder and a piston, the cylinder having an internal cylindrical bore and an inner wall, the piston being slidable within the cylinder, the piston having a top portion and a skirt portion below the top portion, the skirt having a wide portion with a diameter greater than the diameter of the cylinder bore, the piston being made of a resiliently deformable material and, upon insertion into the cylinder, the piston deforms such that there is no clearance between the wide portion of the piston and the inner wall of the cylinder. The skirt portion of the piston may also have an elliptical cross-sectional profile, the elliptical cross-sectional profile having a long axis longer than the inside diameter of the cylinder and a short axis shorter than the inside diameter of the cylinder.

18 Claims, 3 Drawing Sheets

5,476,076

INTERNAL COMBUSTION PISTON ENGINE UTILIZING INTERFERENCE MOVABLE FIT TECHNOLOGY

FIELD OF THE INVENTION

The invention relates to internal combustion engines.

BACKGROUND OF THE INVENTION

It is well known that the thermal expansion rates of pistons and cylinders in internal combustion chambers are different. To compensate for the differences between the thermal expansion rates of pistons and cylinders, pistons are usually machined to have a smaller diameter than the cylinder they are contained in. This difference in diameters, often referred to as "clearance fitting", ensures that as the piston and cylinder expand in high temperatures, there will be some space between the piston and the cylinder walls during operation. In most engines, the clearance between the piston and the cylinder walls is in the range of 0.02 to 0.04 mm.

To minimize the loss of gas pressure in the combustion chamber, the piston is generally provided with piston rings. The clearance between the piston and the cylinder decreases the sealing performance of the piston rings. As a result, there is a loss of pressure in the combustion chamber of the engine and a subsequent loss of engine performance. Furthermore, because there is a space between the piston and the cylinder, the piston is able to oscillate from side to side. This side to side oscillation of the piston reduces engine power, increases engine noise and further decreases the sealing performance of the piston rings.

SUMMARY OF THE INVENTION

The present invention overcomes the limitations of the prior art by providing an internal combustion piston engine having a cylinder and a piston, the cylinder having an internal cylindrical bore and an inner wall, the piston being slidable within the cylinder, the piston having a top portion and a skirt portion below the top portion, the skirt having a wide portion with a diameter greater than the diameter of the cylinder bore, the piston being made of a resiliently deformable material and, upon insertion into the cylinder, the piston deforms such that there is no clearance between the wide portion of the piston and the inner wall of the cylinder.

The skirt portion of the piston may also have an elliptical cross-sectional profile, the elliptical cross-sectional profile having a long axis longer than the inside diameter of the cylinder and a short axis shorter than the inside diameter of the cylinder.

BRIEF DESCRIPTION OF THE DRAWINGS

Further features and advantages of the internal combustion engine embodying the present invention will now be described and made clearer from the ensuing description, reference being had to the accompanying drawings, in which.

DETAILED DESCRIPTION OF THE PREFERRED EMBODIMENT

Figure 1:
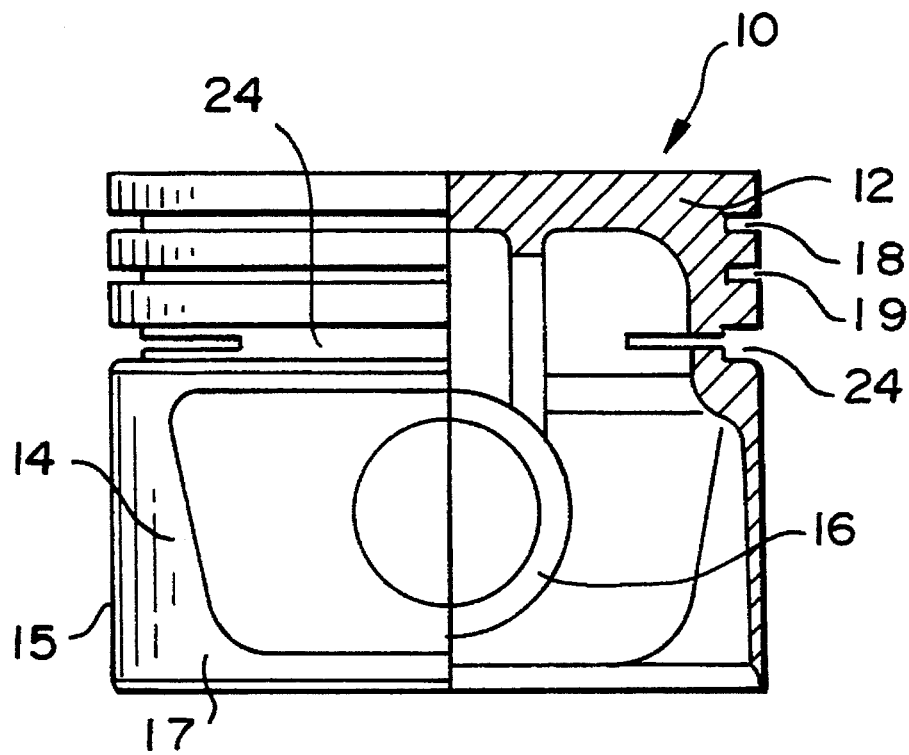
FIG. 1 is a side view, partly in long-section, of the piston portion of the present invention.
Figure 3:
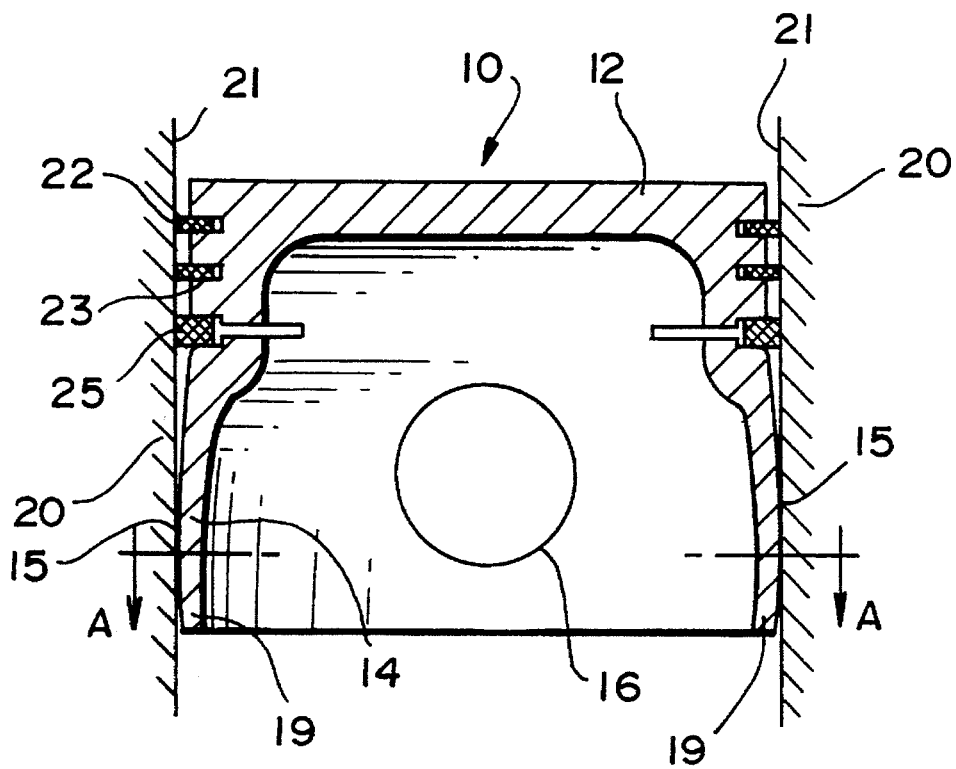
FIG. 3 is a long-sectional view of the piston portion of the invention contained in the cylinder.

Referring to FIGS. 1 and 3, the invention comprises an internal combustion engine having a piston, shown generally as 10 and the cylinder shown generally as item 20. Piston 10 is dimensioned to fit within cylinder 20. Cylinder 20 is formed in the engine block (not shown) and is provided with inside walls 21 and an opening at its lower end to enable the connecting rod (not shown) to connect piston 10 with the crank shaft (not shown). The engine block may be provided with several piston and cylinder combinations. The top portion of cylinder 20 is sealed by a cylinder head (not shown). Piston 10 includes head portion 12, skirt portion 14 located towards the bottom of piston 10, and pin support 16. A combustion chamber (not shown) is formed between the head portion 12 of piston 10 and the cylinder head. Head 12 bears the pressure formed in the combustion chamber. Pin support 16 is designed to transmit force from the piston to the connecting rod. Skirt 14 aligns piston 19 in cylinder 20. Additional items not shown in the figures include such items as fuel injectors, spark plugs, intake and exhaust valves, cam shafts, and the like. These additional items are important, but are not the subject of this application.

Figure 2:
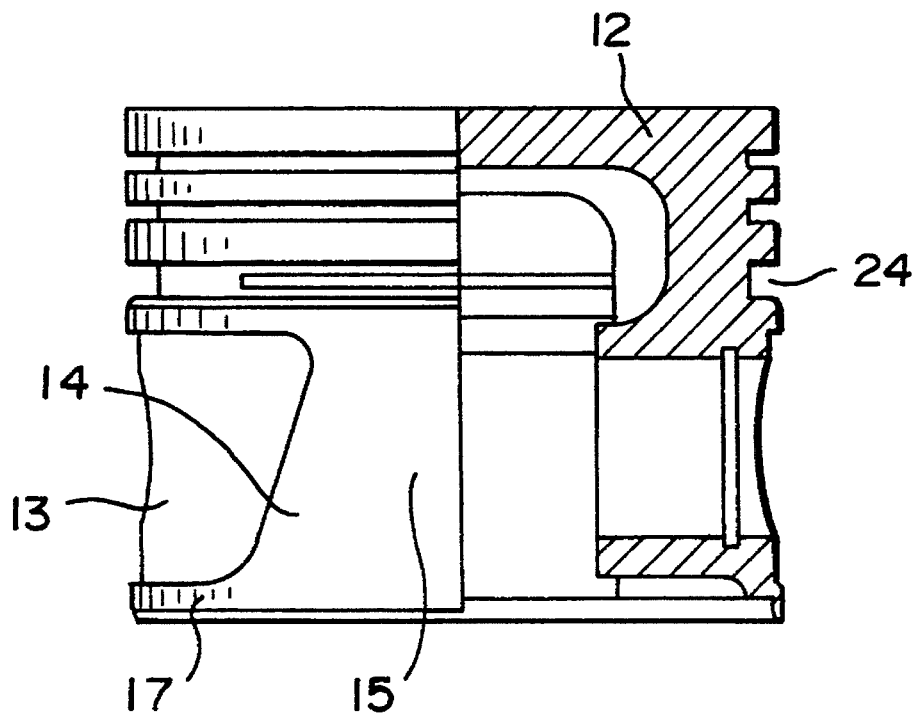
FIG. 2 is a front view, partly in long-section, of the piston portion of the present invention.

As best seen in FIGS. 1, 2 and 3, slots 18 and 19 are provided along the top portion of piston 10 and are dimensioned to retain upper piston rings 22 and 23 respectively. Upper piston rings 22 and 23, which are sometimes referred to as compression rings, provide a seal between head portion 12 and cylinder 20 and thereby reduce the loss of pressure in the combustion chamber. Slot 24 is formed on piston 10 below slots 18 and 19. Slot 24 retains an oil ring 25, which serves to control the distribution of oil to the inside walls 21 of the cylinder.

Skirt 14 is provided with load bearing faces 15, concave portions 13, rim 17 located below concave portions 13, and a bottom edge 19 located below load bearing faces 15. Load bearing faces 15 are located on opposite sides of piston 10, and are configured to bear against the inside walls 21 of cylinder 20.

As best seen in FIG. 3, piston 10 has an approximately barrel shaped profile in long section. Before being inserted into cylinder 20, the diameter of skirt 14 as measured between load bearing faces 15 is wider than the inside diameter of cylinder 20. Piston 10 is made of a resiliently deformable material, usually a steel alloy. When piston 10 is inserted into cylinder 20, the piston is deformed slightly such that load bearing faces 15 are pressed against inside wall 21 of the cylinder. The diameter of piston 10 as measured between bottom edges 19, is less than the inside diameter of cylinder 20. Hence, when piston 10 is inserted into cylinder 20, bottom edges 19 are spaced slightly away from inside wall 21. Head portion 12 of piston 10 has a diameter less than the diameter of cylinder 20 to accommodate piston rings 22, 23 and 25.

Figure 4:
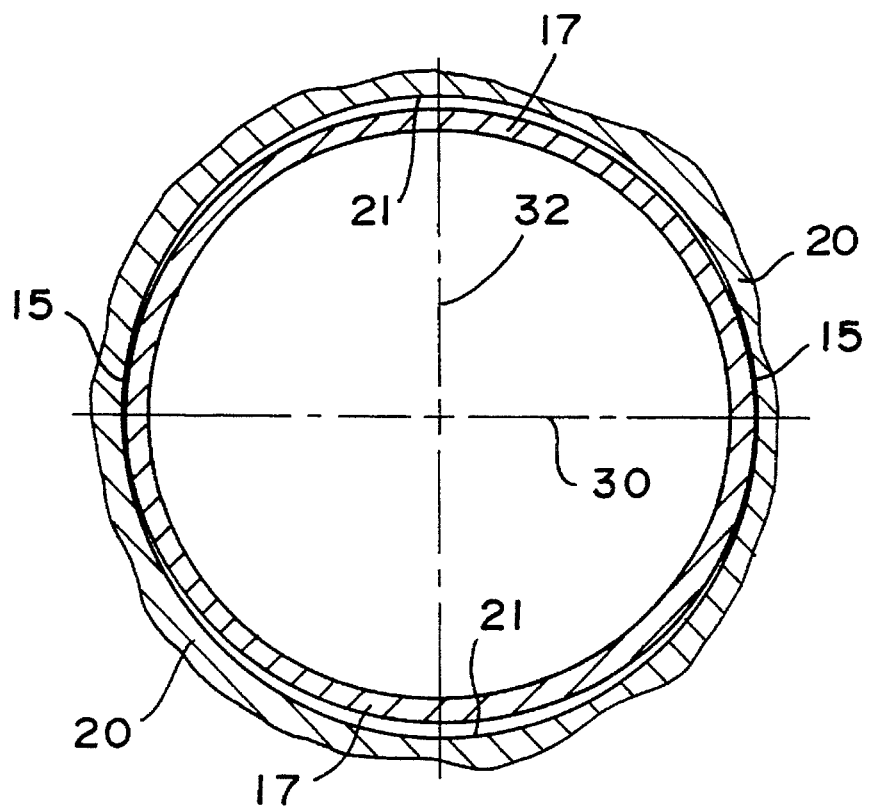
FIG. 4 is a cross sectional view of the piston portion of the invention taken along line A—A in FIG. 3.

As best seen in FIG. 4, the cross sectional profile of skirt portion 14 of piston 10 is elliptical and has a long axis 30 and a short axis 32. Load bearing faces 15 are located at the ends of long axis 30, and rim portions 17 are located at the ends of short axis 32. As stated above, a portion of piston 10 is actually wider than the inside diameter of the cylinder. In particular, the outside diameter of skirt 14 as measured along axis 30 is wider than the inside diameter of the cylinder. Also, the outside diameter of skirt 14 as measured along axis 32 is narrower than the inside diameter of cylinder 20. The diameter of the skirt as measured along axis 30 is the maximum diameter of the skirt, while the diameter of the skirt along axis 32 is the minimum diameter of the skirt.

The inside of cylinder 20 has a circular cross section; therefore, the load bearing surfaces 15 of piston 10 press against inside walls 21 of cylinder 20 when the piston is placed in the cylinder. For the purposes of this patent application, this arrangement of a piston having a larger diameter than its corresponding cylinder is referred to as an "interference fitting" arrangement. Piston 10 and cylinder 20 are machined such that the interference fitting arrangement exists while the engine is cold, i.e. before the engine reaches its operating temperature. While the engine is cold, there is no clearance between load bearing surfaces 15 and inside walls 21 of cylinder 20. As illustrated in FIG. 4, there is a slight clearance between the rim portions 17 of piston 10 and the inside walls 21 of cylinder 20 while the engine is cold. The magnitude of the clearance between rim portions 17 and inside walls 21 has been exaggerated in FIG. 4 for the purposes of illustration. In an engine made in accordance to this invention, the gap between rim portion 17 and inside wall 21 would be a fraction of a millimeter.

Figure 5:
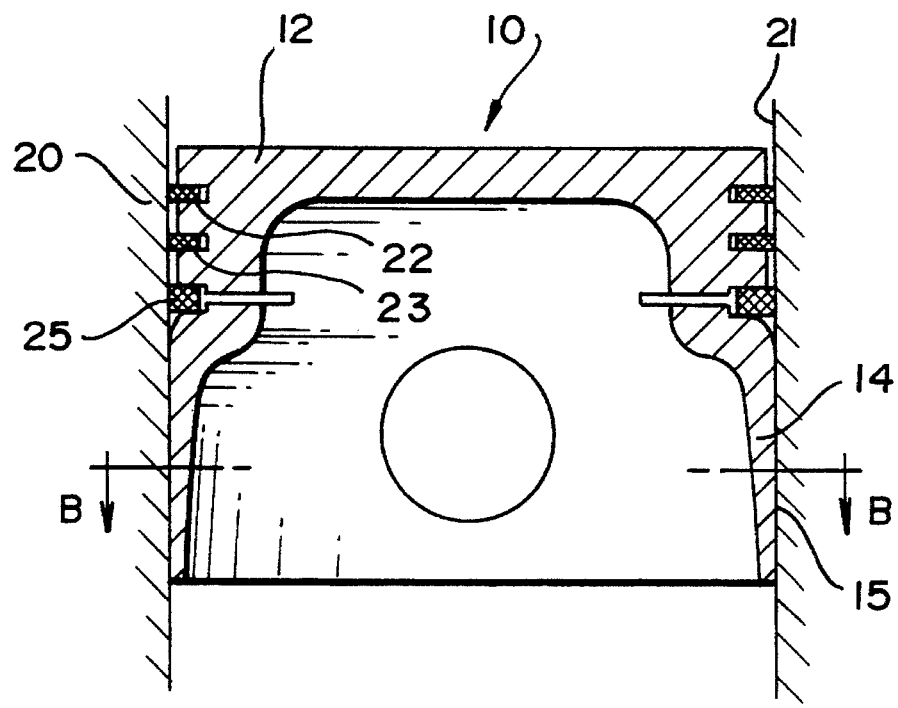
FIG. 5 is a sectional view of the piston portion of the invention contained in the cylinder, the piston and cylinder having been thermally expanded.
Figure 6:
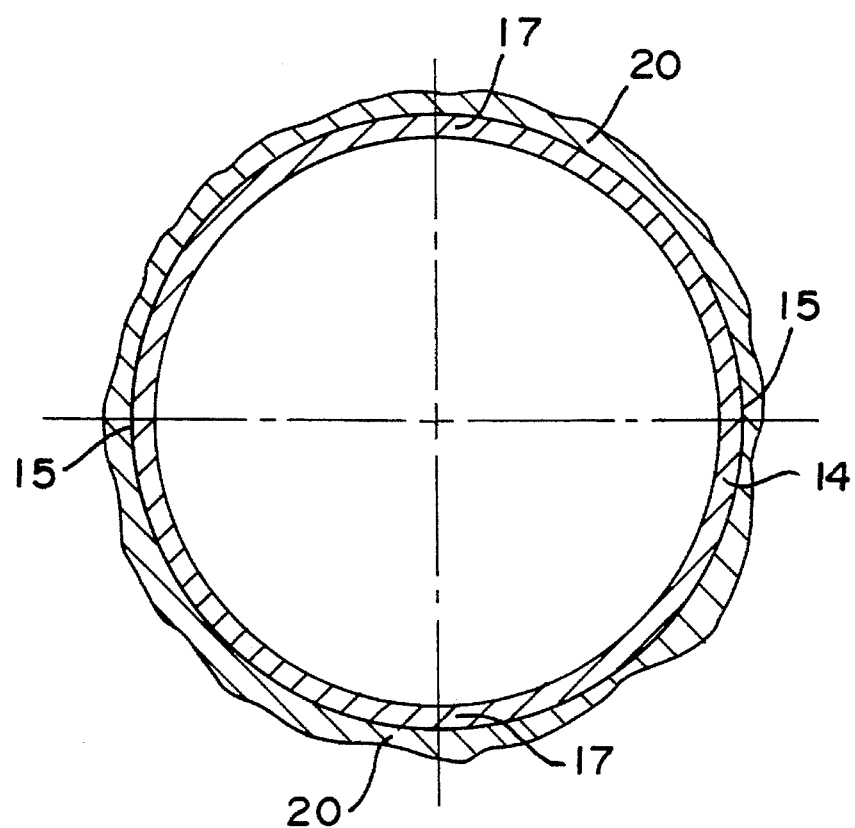
FIG. 6 is a cross sectional view of the piston portion of the invention taken along line B—B in FIG. 5.

As best seen in FIGS. 5 and 6, as the engine begins to heat up, the piston and the cylinder undergo thermal expansion. The piston will expand more than the cylinder, hence piston 10 takes on a more cylindrical shape as it expands against the cylinder. Head portion 12 of the piston is sized such that its diameter remains less than the diameter of the cylinder after thermal expansion. Piston rings 22, 23 and 25 are pressed against the inside walls 21 of cylinder 20 as the head portion 12 of the piston undergoes thermal expansion. When heated, the skirt portion 14 of the piston expands such that rim portions 17 and bottom edges 19 also bear against the inside walls 21 of cylinder 20, thereby sealing the bottom of the cylinder. Since cylinder 20 has a circular profile, the cross sectional profile of the skirt portion of the expanded piston is also circular.

Preferably, the skirt portion of the cold piston has an elliptical cross section. It is expected that pistons having other cross sectional profiles would also be effective.

A low friction surface may be applied to the outside surface of the piston and the inside surface of the cylinder. Many low friction surface treatments are known in the art.

The seal formed by the thermally expanded skirt portion 14 helps to seal piston 10 in cylinder 20 and thereby reduce the pressure losses in the combustion chamber. The seal provided by expanded skirt portion 14 may, in some embodiments, be sufficient to reduce the number of upper piston rings.

The greater sealing efficiency of piston 10 improves engine efficiency by increasing the pressure and temperature in the combustion chamber at the end of the compression stroke, and thereby improving the efficiency of the combustion process. Also, since there is no clearance between skirt portion 14 and cylinder 20 while the engine is in operation, the side to side oscillation of the piston is prevented and the engine runs quieter as a result. The elimination of the side to side oscillation of the piston also reduces engine wear.

The outside diameter of skirt 14, as measured between load bearing surfaces 15, is preferably between 0.03 mm to 0.07 mm wider than the inside diameter of cylinder 20. Good results have been achieved with a piston having a skirt with an outside diameter of 0.05 mm greater than the inside diameter of the corresponding cylinder. The specific dimensions of the piston and cylinder depend on the size of the engine, the desired working temperature of the engine, and the material the piston and cylinder are made from.

EXPERIMENTAL RESULTS

A test was conducted using a standard Q6100 internal combustion piston engine in a Chines Dongfeng EQ140 automobile. The vehicle's engine was modified by replacing the standard pistons found in the engine with pistons as described above. The replacement pistons had a skirt portion having a diameter 0.05 mm wider than the corresponding cylinder. The total height of each piston was 80 mm and the thickness of the skirt of each piston was 1.6 mm. The test vehicle was driven a distance of 20,000 km and compared to an identical engine having standard pistons. The fuel consumption ratio of the test engine was 313 g/kw.h as compared to 320 g/kw.h in the standard engine; a saving of 2.2% on fuel consumption. Power and torque in the test engine was 10% greater in the test engine. The oil consumption in the test engine was 50% lower compared to the standard engine. The test engine also experienced an increase in its service life.

While the internal combustion engine has been illustrated and described with respect to the preferred embodiment, it will be appreciated by those skilled in the art that numerous variations of these embodiments may be made without departing from the scope of the invention.

Therefore what is claimed is:

1. An internal combustion engine comprising,
   a) a cylinder having an internal cylindrical bore and an inner wall;
   b) a piston slidable within the cylinder, the piston having a top portion, a skirt portion below the top portion, and side walls, the skirt having a wide portion with a diameter greater than the diameter of the cylinder bore, and
   c) the piston being made of a resiliently deformable material and, upon insertion into the cylinder, the piston deforms such that there is no clearance between the wide portion of the piston and the inner wall of the cylinder.

2. The internal combustion engine as defined in claim 1 wherein the skirt portion of the piston has a non circular cross sectional profile having a maximum and a minimum diameter, the maximum diameter of the skirt being greater than the diameter of the bore of the cylinder and the minimum diameter of the skirt being less than the diameter of the bore, the minimum diameter of the skirt selected to remain less than the diameter of the bore when the piston is inserted into the cylinder.

3. The internal combustion engine as defined in claim 2 wherein the piston has two load bearing faces positioned on opposite sides of the skirt portion, the skirt portion having a substantially elliptical cross sectional profile having a long axis and a short axis, the load bearing faces positioned at the ends of the long axis of the ellipse, the diameter of the skirt between the load bearing faces being greater than the diameter of the cylinder bore, the diameter of the skirt along the short axis of the ellipse being less than the inside diameter of the cylinder bore, the load bearing faces adapted to press against the inner wall of the cylinder when the piston is inserted into the cylinder.

4. The internal combustion engine as defined in claim 3, wherein the skirt is dimensioned such that the diameter of the skirt along the short axis of the ellipse is less than the diameter of the cylinder bore when the piston is inserted into the cylinder.

5. The internal combustion engine as defined in claim 4, wherein the piston and cylinder are thermally expandable, the diameter of the skirt along the long and short axis of the ellipse being selected such that when the piston is contained in the cylinder and heated to a preselected operating temperature for the engine, the piston takes on a circular cross sectional profile and there is no clearance between the cylinder and the skirt.

6. The internal combustion engine as defined in claim 5 wherein the diameter of the top portion of the piston is selected to be less than the inside diameter of the cylinder when the piston is contained in the cylinder.

7. The internal combustion engine as defined in claim 6 wherein the top portion of the piston is provided with at least one circumferential groove for receiving a piston ring.

8. The internal combustion engine as defined in claim 5 wherein the diameter of the skirt portion of the piston at its widest point is between 0.02 mm to 0.06 mm wider than the inside diameter of the cylinder.

9. The internal combustion engine as defined in claim 5 wherein the diameter of the skirt portion of the piston at its widest point is 0.05 mm greater than the inside diameter of the cylinder.

10. The internal combustion engine as defined in claim 2, wherein the piston and cylinder are thermally expandable, the maximum and minimum diameters of the skirt being selected such that when the piston is contained in the cylinder and heated to a preselected operating temperature for the engine, the skirt takes on a circular cross sectional profile and there is no clearance between the cylinder and the skirt.

11. The internal combustion engine as defined in claim 5 wherein the side walls of the piston are provided with a low friction wear resistant surface.

12. The internal combustion engine as defined in claim 10 wherein the top portion of the piston is provided with at least one circumferential groove dimensioned to receive a piston ring, the top portion of the piston having a diameter selected to be less than the inside diameter of the cylinder upon insertion into the cylinder and after the piston and cylinder have been heated to the operating temperature of the engine.

13. The internal combustion engine as defined in claim 5 wherein the skirt of the piston is provided with a bottom edge, the diameter of the skirt along the bottom edge being less than the diameter of the cylinder bore.

14. The internal combustion engine as defined in claim 2 wherein the diameter of the top portion of the piston is less than the inside diameter of the cylinder when the piston is contained in the cylinder.

15. The internal combustion engine as defined in claim 2 wherein the diameter of the skirt portion of the piston at its widest point is between 0.02 mm to 0.06 mm wider than the inside diameter of the cylinder before insertion into the cylinder.

16. The internal combustion engine as defined in claim 15, wherein the piston and cylinder are thermally expandable, the maximum and minimum diameters of the skirt being selected such that when the piston is contained in the cylinder and heated to a preselected operating temperature for the engine, the skirt assumes a circular cross sectional profile and there is no clearance between the cylinder and the skirt.

17. The internal combustion engine as defined in claim 16 wherein the skirt of the piston is provided with a bottom edge, the diameter of the skirt along the bottom edge being selected such that it remains less than the diameter of the cylinder bore when the piston is inserted into the cylinder.

18. The internal combustion engine as defined in claim 17 wherein the diameter of the bottom edge of the skirt is selected such that upon heating to the selected operating temperature of the engine it expands and there is no clearance between the bottom edge and the cylinder.

* * * * *